Figure 1:
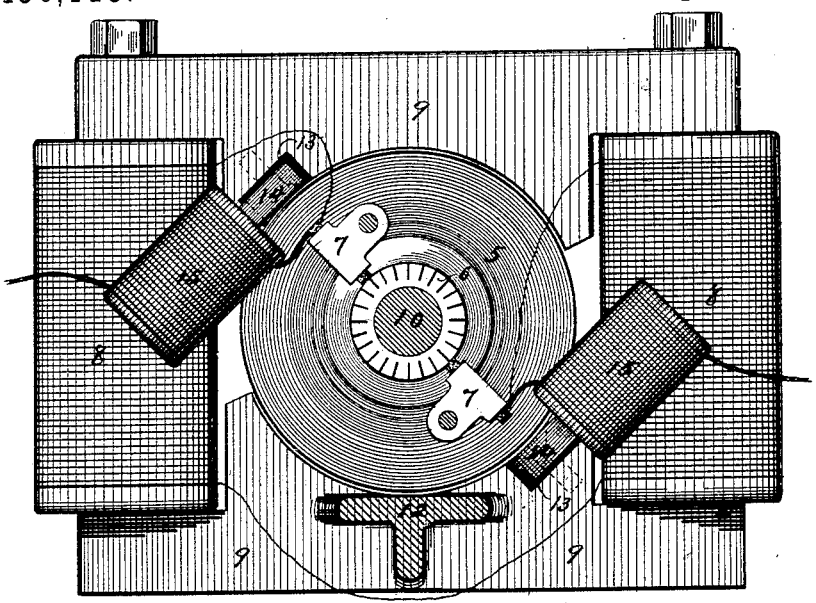

(No Model.)

LA MOTTE C. ATWOOD.
MAGNETO ELECTRIC MACHINE.

No. 436,113.                Patented Sept. 9, 1890.

Witnesses:
M. S. Rider.
A. Friedman.

Inventor:
La Motte C. Atwood,
By Howe & Howe
Attorneys.

UNITED STATES PATENT OFFICE.

LA MOTTE C. ATWOOD, OF ST. LOUIS, MISSOURI, ASSIGNOR TO THE ATWOOD ELECTRIC COMPANY, OF SAME PLACE.

MAGNETO-ELECTRIC MACHINE.

SPECIFICATION forming part of Letters Patent No. 436,113, dated September 9, 1890.

Application filed May 17, 1890. Serial No. 352,191. (No model.)

*To all whom it may concern:*

Be it known that I, LA MOTTE C. ATWOOD, a citizen of the United States, residing at St. Louis, in the State of Missouri, have invented a certain new and useful Improvement in Magneto-Electric Machines, of which the following is such a full, clear, and exact description as will enable any one skilled in the art to which it appertains to make and use the same, reference being had to the accompanying drawings, forming part of this specification.

My invention relates to means for regulating dynamo-electric machines.

The object of the invention is to prevent the shifting of what is known as the "polar" line in magneto-electric machines, and to thus keep the brushes always at a non-sparking-point, whereby a maximum amount of work will at all times be gotten from the machine.

The invention consists in applying to a magneto-electric machine one or more magnetic bars at or near the normal polar line, which magnetic bars may be permanent magnets or may receive their magnetism from coils placed in the circuit of the main line. The polar line in magneto-electric machines is the resultant of two factors—namely, the magnetism generated by the current flowing in the armature and the magnetism of the field-magnets generated by the current flowing through the field-coils. Should the magnetism in the armature become greater than that in the field-coils, or that in the field-magnets become greater than that in the armature, the polar line will shift back and forth, as the case may be. This is brought about by the varying conditions under which the machine works. To prevent sparking and secure a maximum amount of work from magneto-electric machines, the commutator-brushes should always be kept at or near the polar line, which is sometimes also called the "neutral" line. The brushes therefore must be shifted to secure this result or some means devised to prevent the shifting of such polar or neutral line.

I am aware that coils have been wound around the field-magnets and armature to prevent the shifting of this polar line to keep the brushes at a non-sparking maximum point; but in my invention, instead of using coils in this particular way I use one or more magnetic bars, which may be permanent magnets or may be magnetized by coils upon the ends of the same, the said bars being preferably insulated from the pole-pieces.

The invention will best be understood by referring to the accompanying drawings, forming a part of this specification, in which—

Figure 2:
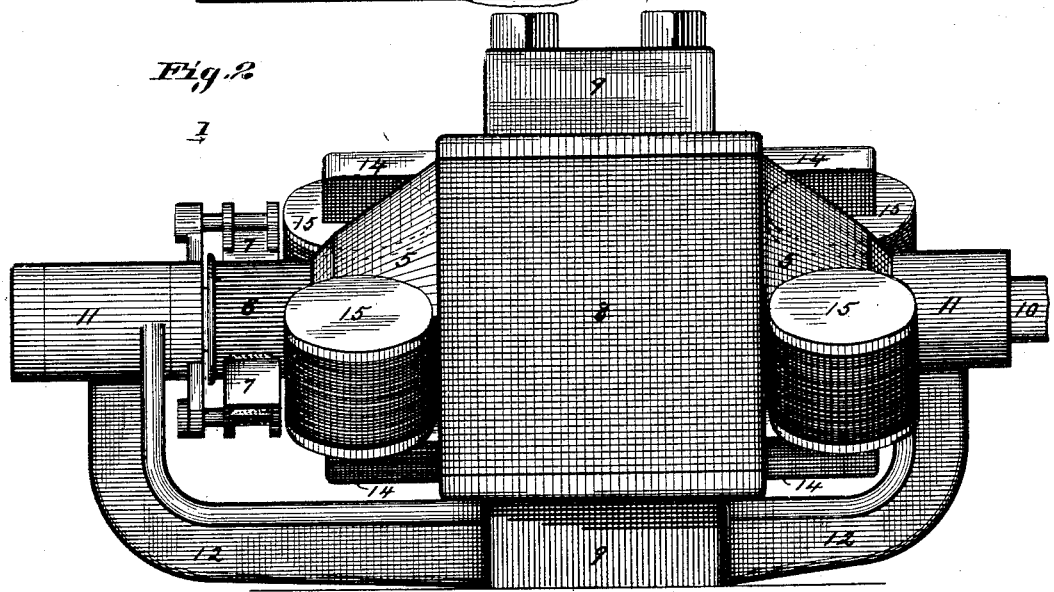

Figure 1 is an end elevation of a magneto-electric machine provided with my improvement, the same being taken on the line 1 1 of Fig. 2. Fig. 2 is a side elevation thereof, and Fig. 3 a detail view showing one of the magnetic bars.

The same figures of reference indicate the same parts throughout the several views.

5 is the armature of a magneto-electric machine; 6, the commutator thereof; 7 7, the commutator-brushes; 8 8, the field-magnet coils, which are in shunt, the cores of which are connected together by yoke-pieces 9 9, making the pole-pieces of the machine.

10 is the armature-shaft, which is sustained by bearings secured to one of the yoke-pieces.

As before stated, the neutral or polar line, at which the brushes should in practice be kept, depends upon the reciprocal relation of the magnetism of the pole-pieces and that of the armature, and is the resultant of those two factors.

Figure 3:
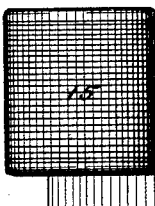

In order to keep the polar line from shifting and maintain the brushes at a non-sparking maximum point under varying conditions of the machine and its circuit, I cut away the pole-pieces at 13 on each side of the armature in the direction of the normal polar line and set therein magnetic bars 14, which act to hold the polar line at this point and keep it from shifting under varying conditions within certain limits. These magnetic bars, I preferably insulate from the pole-pieces, to which they may be attached by non-magnetic screws. Said bars may be permanent magnets, or they may be made in the form of a yoke or bail, as shown in Fig. 3, and have coils 15 upon the ends thereof, which coils are in the circuit of the main line and extend out at each side of the machine. The said bars are insulated from the pole-pieces in order to give them as great an effect as possible and prevent the magnetism thereof from becoming diffused and dissipated through the pole-pieces. The magnetic force of such bars is therefore concentrated upon the polar line between the pole-pieces and the armature, where the resultant of the magnetism of the pole-pieces and the armature is. This therefore more effectually regulates a dynamo and keeps the polar line from shifting than the mere winding of the coils about the armature or pole-pieces. It is more effective than coils for this purpose for another reason—namely, in that the lines of force resulting from a great number of coils may be concentrated in the magnetic bars, which occupy less space than coils wound about the armature or field-magnets. Bars for this purpose have the further advantage for the reason that a permanent magnet may be used and coils dispensed with. The regulating-coils in my invention may be located at any convenient place, and the pole-pieces need not be cut away to any great extent and thereby decrease the efficiency of the machine, which must necessarily happen where bulky coils are applied to the pole-pieces and around the armature for this purpose.

Having now set forth my improvement, what I desire to claim and secure by Letters Patent of the United States, as my invention is—

A magneto-electric machine having bars applied to the pole-pieces in the direction of the normal polar line, and suitably insulated therefrom, and coils in the circuit of the main line wound upon the ends of said bars to prevent the polar line from shifting under varying conditions and to keep the brushes at a non-sparking maximum point.

In testimony whereof I have hereunto set my hand and affixed my seal, this 14th day of May, 1890, in the presence of the two subscribing witnesses.

LA MOTTE C. ATWOOD. [L. S.]

Witnesses:
A. C. FOWLER,
DANIEL N. KIRBY.